United States Patent [19]

Case

[11] 3,940,371

[45] Feb. 24, 1976

[54] DIAMINO DISULFIDE CURATIVES FOR POLYURETHANES

[76] Inventor: Leslie Catron Case, 14 Lockeland, Winchester, Mass. 01890

[22] Filed: June 6, 1974

[21] Appl. No.: 476,932

[52] U.S. Cl.. 260/77.5 AM; 252/182; 260/77.5 AB; 260/77.5 AC; 260/77.5 AN; 260/75 NM
[51] Int. Cl.² ........................................ C08G 18/32
[58] Field of Search .............. 260/77.5 AM, 75 NM; 252/182

[56] References Cited
UNITED STATES PATENTS 3,456,037   7/1969   Hoeschele .................. 260/77.5 AM

*Primary Examiner*—M. J. Welsh

[57] ABSTRACT

Polyurethane prepolymers are cured with amino-substituted aromatic disulfides to yield cured products with excellent physical properties. These diamine curatives have the added advantage of providing relatively long pot lives and result in cured products with superior hydrolytic and chemical stability.

38 Claims, No Drawings

DIAMINO DISULFIDE CURATIVES FOR POLYURETHANES

BACKGROUND OF THE INVENTION

1. Field of the Invention

This invention is concerned with curing agents for isocyanato-substituted prepolymers and with the use of these curatives in preparing cured polyurethanes. More specifically, this invention is concerned with aromatic diamino disulfides as curatives in the preparation of crosslinked polyurethane compositions.

2. Description of the Prior Art

Polyurethane elastomers possess excellent physical properties, such as good elasticity, high tensile and tear strengths and excellent resistance to chemical solvents and to abrasion, and their commercial use has been increasing at a rapid rate. These materials are formed by reacting a hydroxy-terminated polymer, such as a polyether or a polyester for example, with a polyfunctional isocyanate and a curing agent. This reaction can be carried out in one step in which all components are mixed together directly, or, more frequently, by a two-step method, generally referred to as the prepolymer technique. In the latter technique the polymeric diol is first reacted with an amount of diisocyanate in excess of the stoichiometric requirement to yield an intermediate polymer bearing reactive isocyanato groups. This polymer is variously referred to in the trade as an isocyanato-terminated prepolymer, or a polyurethane prepolymer or a polyisocyanate prepolymer. Such prepolymers can be readily purchased and are used by a large variety of small and medium-sized formulators together with a curative to form shaped polyurethane articles. Because of its ease and convenience in use, the reproducibility of results, and the savings in time, the prepolymer technique enjoys wide use.

Prepolymers can theoretically react with any compound containing sufficiently labile hydrogens to yield chain-extended or cross-linked polymers. In practice, however, compounds suitable for cross-linking, generally referred to as curatives, curing agents, or hardeners, have been limited to polyols and to primary aromatic diamines, and the precise nature of the specific curing agent has been found to have a significant, yet largely unpredictable effect on the elastomer properties. It has been generally recognized, though, that prepolymers cured with aromatic diamines exhibit superior physical properties and require shorter cure cycles than polyolcured compositions, and that among aromatic diamines those with the amino groups in the para positions are far better curatives than the corresponding isomers in which the amino groups occupy ortho positions.

A great variety of aromatic diamines have been examined as curatives but surprisingly very few have been found suitable for practical use. Most appear to be unsatisfactory for a variety of technical and/or economic reasons, such as lack of ready availability, too high a cost, too high a melting point, too great a reactivity, too short a pot life, too high a toxicity, limited compatibility with prepolymers, poor physical properties of the cured product, and so forth. Summaries of results obtained in studies with diamine curatives can be found, for example, in J. H. Saunders and K. C. Frisch "Polyurethanes, Chemistry and Technology, Part I, Chemistry", Interscience Publishers, New York, N. Y. 1962, pages 279 and 295, and in L. N. Phillips and D. B. V. Parker "Polyurethanes, Chemistry, Technology and Properties" Illife Books Ltd. London, 1964, page 46. Another reference which reports on aromatic diamine curatives is S. Hashimoto, T. Koide, and J. Sunamoto, Chemistry of High Polymers, Tokyo, 22(7), 422–428 (1965). The latter reference includes results obtained with standard aromatic diamines and also with specific aromatic diamines derived from anilines by coupling them in the para position through the bridging groups, $-CH_2-$, $-CH=CH-$, $-S-S-$, $-SO_2-$, and $-CO-$. Again, some of these bridged diamines react too rapidly and possess pot lives too short for practical use. Others, such as sulfonyl bisaniline proved to be too high melting, and 4,4'-diaminodiphenyldisulfide was found to be too reactive, resulting in a pot life shorter than that commercially acceptable and to cure poorly resulting in cured products which were distinctly soft and inferior in physical properties.

4,4'-Methylene bis(2-chloroaniline) generally known and referred to as MOCA yields cured products with excellent properties and among aromatic diamines has gained nearly universal preference for commerical use, despite the fact that its compatibility with prepolymers is often poor, that its melting point necessitates a relatively high working temperature, that it frequently exhibits an unsatisfactorily short pot life, and most importantly is held to be toxic. Another aromatic diamine which has also found some commercial use in some instances is 3,3'-dichlorobenzidine. In 1973, (Federal Register, Vol. 38, Page 10929 May 3, 1973), the widespread use of MOCA was dealt a very severe blow by an emergency temporary standard established by the Department of Labor under the Williams-Steiger Occupational Safety and Health Act (OSHA) of 1970. This standard places MOCA on a list of alleged carcinogens and sets forth very restrictive and costly work practices and stringent, expensive controls and safeguards designed to protect personnel from exposure to these compounds. 3,3'-Dichlorobenzidine is also included in the same standard.

Because of the lack of an available substitute curative these OSHA standards and regulations threaten to have a grave impact on the cast polyurethane elastomer industry, especially on the many small and medium-sized molders who are unable to meet the expense necessaray to comply with the measures required by law to handle MOCA. As a consequence a feverish research effort has ensued to develop other, safer, yet effective, curatives for isocyanato-terminated prepolymers.

SUMMARY OF THE INVENTION

It is an objective of the present invention to provide novel curing agents which can be used in place of MOCA.

Another objective is to provide curing agents which possess superior compatibility with prepolymers and which exhibit improved pot lives.

Still another objective of this invention is to provide a process for curing polyurethane prepolymers to yield compositions with good physical properties.

I have accomplished these objectives by my discovery that organic diamino disulfides possessing a certain degree of reactivity, i. e. those which react with isocyanato groups at a rate equal to or slower than MOCA, constitute very satisfactory curatives for prepolymers containing isocyanato groups and yield cured elastomeric and elastoplastic polyurethanes with excellent physical properties. Diamino disulfides which I have found quite useful contain two primary amino groups which are present as substituents on an aromatic nucleus and they comprise diaminoaryl alkyl disulfides and diaminodiaryl disulfides. Thus useful curatives will have the general formulas $(NH_2)_2Ar—S—S—R$, $(NH_2)_2Ar—S—S—Ar'$, and $NH_2—Ar—S—S—Ar'—NH_2$, wherein Ar and Ar' are monocyclic or polycyclic aromatic or heteroaromatic hydrocarbon radicals, and R is a straight-chain or branched aliphatic, cycloaliphatic, or aralkyl aliphatic hydrocarbon radical. The radicals Ar and Ar' may be identical, i. e. Ar = Ar', or they may be different, i. e. Ar ≠ Ar'. In monocyclic radicals, the aromatic primary amino groups may be located in the ortho or 2-position, in the meta or 3-position, or in the para or 4-position in relation to the disulfide bridging group. In polycyclic aryl radicals the amino groups may be located, in addition to these positions, in any position in the aryl ring or rings not directly attached to the disulfide bridging group. In addition, the radicals Ar and Ar' may carry other substituents nonreactive with isocyanato groups, such as for example halo radicals like chloro or bromo radicals, cyano, lower alkyl, lower alkoxy, lower acyloxy, lower carbalkoxy, and nitro radicals. Diamino disulfides of the general formula $NH_2—Ar—S—S—R'—NH_2$ and $NH_2—R'—S—S—R'—NH_2$ in which Ar is a radical as defined hereinabove and R' is a tertiary aliphatic or cycloaliphatic hydrocarbon radical in which the amino group is attached to the tertiary carbon atom are also of value in as much as the reactivity of such diamino disulfides can be appropriate for their use as curatives. Mixtures of diamino disulfides may be employed. The instant curatives may also advantageously be used in admixture with amine curing agents and with polyol curing agents known to the art.

Useful diamino disulfides within the scope of the present invention are characterized by reacting with isocyanato groups at a rate equal to or slower than MOCA. This reactivity can be readily determined via a simple experimental test. In order to conduct this test I melt the prospective curative and I take 10 grams of a polycaprolactone-based prepolymer having an equivalent weight of 1000, heat the prepolymer to 65° C. and then rapidly stir into and homogeneously admix with the prepolymer the molten curative in an amount corresponding to 90% of the stoichiometric amount theoretically required on the basis of one $NH_2$ group per one isocyanato group. This reaction mixture is maintained at 65° C. until it gels and the time required to effect gelation, i.e. the time at which the reaction mixture does not flow anymore, is measured. In order for the curative to be useful for the purposes of my invention this gelation time should be equal to or longer than the gelation time observed for MOCA if it is employed as curative in the same manner in the same test. The polycaprolactone prepolymer which I use for this test is described in "NIAX Caprolactone Polyols for Urethane Elastomers", Union Carbide Corporation, Rubber Chemicals, 1968, p. 10", and it may be purchased or it may be prepared by a standard procedure well known to those skilled in the art. For example, a convenient procedure consists of reacting 100 parts of a polycaprolactone diol of molecular weight of 2000 with 19.1 parts of prepolymergrade mixed (80% 2,4-isomer and 20% 2,6-isomer)tolylene diisocyanate, by heating these materials at 65° C. for about 8 hours with stirring.

The diamino disulfides of the present invention frequently have melting points of 100° C. or less and they exhibit gelation times ranging from about 5 or 10 minutes to as much as an hour or more depending on the nature of the prepolymer and the reaction temperature employed. The cured products prepared from these curatives possess physical properties, such as for example, tear strength, tensile strength, and abrasion resistance comparable to those obtained by curing the respective prepolymers with MOCA. Most polyurethane elastomers prepared according to the present invention exhibit, in addition, very superior elongation to break. In many instances, the curatives of the instant invention also result in cured compositions with hydrolytic stability and with chemical resistance superior to that obtained by the use of MOCA curative. Elastomers prepared according to the present invention also have good resistance to exposure to light.

Many of the diaminodiaryl disulfides of the present invention are well known in the art. Some of them are sold commercially as chemical intermediates for the preparation of dyes and as pharmaceuticals. There are also several standard methods of preparation well known to those skilled in the art by which these compositions can be made. For example, according to Paul et al, U.S. Pat. No. 2,435,508, diaminodiaryl disulfides may be prepared directly from an aromatic amine and sulfur by simply heating them together. This process uses extremely cheap and readily available raw materials but results in low yields and produces a mixture of isomeric products. For purposes of the present invention, however, such an isomeric mixture can frequently be used directly without separation. Another route to the curatives of the present invention involves a two-step process. The first step is the preparation of aminoarylthiols by the reduction of nitroaromatic sulfonyl chlorides or nitroaromatic thiols using conventional, standard procedures well known to those skilled in the art. The second step consists of the oxidation of the aminoarylthiols. This oxidation can be effected by air in a neutral to slightly alkaline medium (Lantz, U.S. Pat. No. 1,933,217 ), or through the use of hydrogen peroxide (Organic Syntheses, Col. Vol III, Edited by E. C. Horning, John Wiley and Sons, Inc., New York, 1955, pages 86–87). Yet a third synthetic method for the preparation of the curatives of this invention involves the reaction of aromatic nitrohalo compounds with sodium sulfide, or sodium sulfhydrate (Lantz, U.S. Pat. No. 1,933,217; Crowley, U.S. Pat. No. 3,150,186). In this procedure reduction and coupling can be accomplished in one step or a two-step procedure may be required depending on the specific compound being synthesized.

The instant curing agents are reacted with the polyurethane prepolymers by conventional experimental procedures. Any convenient method of mixing curative and prepolymer may be used and standard precautions to exclude moisture are employed.

In contrast to curatives presently employed in the art, many of the curatives of the present invention exhibit excellent compatibility with prepolymers and the molten curatives can be mixed into the prepolymers at temperatures substantially below 100° C. and do not reprecipitate during or subsequent to admixing even at temperatures which may be as low as room temperature.

While the instant curatives can be used in the same proportions and the reaction mixture cured at the same temperatures conventionally employed in the art, it is not advisable to do so when best performance and optimum properties are desired. In order to obtain the best results, the stoichiometric ratio of amino groups to isocyanato groups employed and the temperature at which the reaction mixture containing the curative and the prepolymer is held to provide an elastomer differs from the normal practice of the art. Specifically, in order to obtain all of the beneficial results of the present invention it is necessary to (1) employ the curative and the prepolymer in amounts such that the equivalent ratio of amino groups to isocyanato groups is at least about 0.5 and generally not more than 0.9, and (2) cure the reaction mixture at temperatures not exceeding about 95° C. The term cure temperature as used herein refers to the temperature at which the reaction mixture is maintained until it is substantially cured, i.e. it reaches a degree of hardness which is within no more than about ten points of its final value as measured with a Shore durometer. In order to attain and insure complete crosslinking, post-cure cycles are optionally employed and temperatures suitable for such cycles are referred to as post-cure temperatures. Thus the temperature of the cured elastomer may be raised above 95° C. and the compositions may be post-cured at temperatures as high as 150° C. It is to be understood, however, that it is entirely feasible to carry out the entire cure cycle about 95° C. if less than optimum physical properties are acceptable.

DESCRIPTION OF THE PREFERRED EMBODIMENTS

Among the diamino disulfide curatives which I have examined there are several groups which I prefer.

One of these groups consists of symmetrical and unsymmetrical diaminodiaryl disulfides having at least one of the amino groups located in the ortho or 2- position relative to the disulfide bridging group. The aryl radicals in these diaminodiaryl disulfides are aromatic hydrocarbon radicals having from 6 to 12 carbon atoms, such as for example phenylene, biphenylene, naphthylene, etc. The two aryl radicals in the molecule need not be the same, and the substituents need not be symmetrically located. Both amino groups may be located on the same aryl radical or on two different aryl radicals, and the second amino group may be located in the ortho or 2- position, in the meta or 3- position or in the para or 4- position relative to the disulfide bridging group. In addition to the amino groups the aryl radicals may carry other substituents which do not react with isocyanato groups, such as for example halo radicals, like chloro or bromo radicals, lower alkyl radicals, lower alkoxy radicals and others. Mixtures of two or more diaminodiaryl disulfides may be employed.

Especially preferred members of this group are symmetrical ortho, ortho' or 2,2'- diaminodiaryl disulfides of the general formula (—S—Ar—NH$_2$)$_2$, wherein Ar is phenylene or biphenylene, and the NH$_2$ groups are both ortho to the disulfide linkage. Other particularly preferred disulfides within this group are unsymmetrical 2,4'-diaminodiaryl disulfides of the general formula ortho—NH$_2$—Ar—S—S—Ar—NH$_2$—para wherein the amino groups are located respectively in the ortho and para positions in the different radicals.

It is especially noteworthy, novel and unexpected that eminently satisfactory curatives have amino groups located in the ortho position of aryl radicals and it is particularly contrary to accepted views that one of the most preferred series of curatives has the basic structure

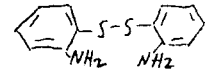

in which both amino groups are ortho substituents. Regarding amine curatives known in the art, it has always been the para amino substituted isomer which has been found most useful as a polyurethane curing agent.

Examples of preferred and especially preferred diaminodiaryl disulfide members of this group are 2,4-diaminophenyl phenyl disulfide, 2,5-diaminophenyl phenyl disulfide, 2,6-diaminophenyl phenyl disulfide, 2,4'-diaminodiphenyl disulfide, 2,2'-diaminodiphenyl disulfide, 2,2'-diaminodibiphenylene disulfide, 2,2'-diamino-4,4'-dichlorodiphenyl disulfide, 2,2'-diamino-4,4'-dimethyldiphenyl disulfide, 2,2'-diamino-3,3'-dimethyldiphenyl disulfide, 2,2'-diamino-4,4'-diethyldiphenyl disulfide, and 2,2'-diamino-4,4'-dimethoxydiphenyl disulfide.

From among this group of curatives I especially prefer 2,2'-diaminodiphenyl disulfide, because it has a combination of good compatibility with prepolymers, very satisfactorily long pot life and yields compositions with exceptionally good physical properties. The longer pot life and processing time made available by this compound make it especially useful in processing faster reacting prepolymers, especially those having equivalent weights of less than about 750, and in molding large objects. Very importantly, this compound has a sufficiently long pot life to allow it to be used as a convenient curative for prepolymers made from methylene bis(4-phenyl isocyanate). 2,2'-Diaminodiphenyl disulfide has long been known and used as a pharmaceutical. Such use clearly indicates a particular degree of safety and lack of serious toxicity hazard. In addition at least two toxicological studies have been performed on this compound and to date no evidence indicating neoplasm formation or carcinogenicity appears to have been found. This material is thus potentially a very favorable alternative to alledgedly carcinogenic curatives now in use.

Some of the compositions in this preferred group may be purchased in commerce. Others are readily synthesized via conventional procedures. The synthetic procedure which I prefer to prepare curatives within this group involves the oxidative coupling of the corresponding aminoarylthiols using either air or hydrogen peroxide. This procedure is described in "Organic Syntheses" Collective Volume III, pp. 86–87, J. Wiley and Sons, Inc., New York, 1955; R. B. Wagner and H. D. Zook, "Synthetic Organic Chemistry" Chapter 33, J. Wiley and Sons, Inc., New York, 1953; Bogert and Snell, J. AM. Chem. Soc. 46, 1309 (1924); and Lantz, U.S. Patent No. 1,933,217.

Another especially preferred curative is 2,2'-diamino-4,4'-dichlorodiphenyl disulfide which is readily prepared from nitro-p-dichlorobenzene, and thus is also potentially readily available and moderate in price. This curative has a melting point of 119°–120° C., only moderately higher than MOCA, is easily mixed with prepolymers and gives a very long pot life. It also tends to give a harder cured product than do the unsubstituted diaminodisulfides. Because of the very long pot life, this compound is primarily useful either with extremely reactive prepolymers, or in the production of massive molded or cast products in which the long processing time available is advantageous.

A second preferred group of diaminodisulfides which I have found to be of considerable merit consists of substituted para,para' or 4,4'-diaminodiaryl disulfides. Especially preferred are 4,4'-diaminodiphenyl disulfides carrying substituents in the ortho or meta position relative to the disulfide bridging group. In contrast to the unsubstituted 4,4'-diaminodiphenyl disulfide which I have found to be essentially unsuitable as a curative inasmuch as it is too reactive to be usable with methylene bis(4-phenyl isocyanate)-derived prepolymers and has far too short a pot life with tolylene diisocyanate-derived prepolymers, the substituted 4,4'-diaminodiphenyl disulfides exhibit good compatibility, satisfactorily long pot lives and yield cured compositions with good tear and tensile properties. The substituents should be unreactive with isocyanato groups and comprise such radicals as halo, alkyl, alkoxy and others. Examples of preferred curatives within this group are 2,2'-dichloro-4,4'-diaminodiphenyl disulfide, 3,3'-dimethoxy-4,4'-diaminodiphenyl disulfide, 3,3'-dimethyl-4,4'-diaminodiphenyl disulfide, 3,3'-diethyl-4,4'-diaminodiphenyl disulfide, and 3,3',5,5'-tetra-lower-alkyl-4,4'-diaminodiphenyl disulfide. Mixtures of two or more of these compounds may be used as curatives. A few members of this group are available commercially, and the others can be synthesized by methods described in the art. The synthetic route which I prefer to prepare these curatives is the reaction of the appropriately substituted para-chloronitrobenzene with sodium sulfhydrate in an aqueous medium as described by Crowley in U.S. Patent No. 3,150,186. Especially preferred is 4,4'-diamino-2,2'-dichlorodiphenyl disulfide which is readily prepared from 4-nitro-o-dichlorobenzene and NaSH, both being inexpensive, readily prepared, and commercially available, the disulfide is thus potentially readily available at a moderate cost. The melting point of this compound is somewhat higher than that of MOCA, (m.p. 125° C.), but is low enough to be conveniently melted and handled in conventional equipment. This compound gives a significantly longer pot life than the unsubstituted 4,4'-diaminodiphenyl disulfide, and a harder cured product.

A third group of diaminodiaryldisulfides which I include among my preferred curatives consists of diaminodinaphthyl disulfides having melting points below 150° C. Representative members of this group are for example bis[8-aminonaphthyl(1)] disulfide and bis [1-aminonaphthyl(2)] disulfide. Both have melting bis [low enough to be processed with conventional equipment and techniques, and both have adequately long pot lives for satisfactory processing. Their cured products have high hardness, good strength and remarkable stability. The bis [8-aminonaphthyl(1)] disulfide is prepared by oxidation of the corresponding aminonaphthothiol obtained by reduction of 8-nitronaphthalene-1-sulfonyl chloride. The bis [1-aminonaphthyl(2)] disulfide is obtained from the corresponding aminonaphthothiol which in turn is prepared from the 1-nitronaphthothiol-2, made by the nitration of the commercially available β-naphthothiol under very mild conditions.

Curatives consisting of mixtures of members selected from among the preferred groups may be employed. Particularly preferred are mixtures containing 2,2'-diaminodiphenyl disulfide. Mixtures of 2,2'-diaminodiphenyl disulfide are of particular utility insofar as these mixtures tend to give cured products which crystallize less readily on aging and thus stay softer and maintain a more uniform hardness than those prepared using a single curing agent. In fact, I have found that while the use of pure 4,4'-diaminodiphenyl disulfide is undesirable, admixtures of 2,2'-diaminodiphenyl disulfide and 4,4'-diaminodiphenyl disulfide may serve as a satisfactory curative. Such admixtures are significantly slower in reactivity, resulting in a longer pot life, and they yield compositions with better properties than the 4,4'-diaminodiphenyl disulfide alone. In general admixtures containing amounts of from about 5% to about 75% of the 4,4'-isomer and from 25% to 95% of the 2,2'-diaminodiphenyl disulfide are very useful. Thus the commercial and technical grades of 4,4'-diaminodiphenyl disulfide which contain significant proportions of 2,2'-diaminodiphenyl disulfide can serve satisfactorily as curatives. Mixtures of the 2,2'- and 4,4'-isomers (also those including the 2,4'-isomer) unsubstituted diaminodisulfides are readily prepared either from unpurified raw materials or by the reaction of aniline and sulfur, in either case making such a mixture available at a potentially very low cost.

The curatives of the present invention are exceedingly useful in that they react with isocyanato-terminated prepolymers to form cross-linked, cured polyurethane compositions with good physical properties. The term isocyanato-terminated prepolymer or polyurethane prepolymer is used herein in the same manner as in the prior art. The instant invention does not reside in the nature of the polyurethane prepolymer to be cured or in a specific interaction with any given prepolymer. Rather, the instant invention resides in the discovery that in comparison to curatives now in use, diamino disulfides provide pot lives of more satisfactory length, are more convenient and safer to handle and, when used according to the teachings presented hereinbelow give excellent physical properties in the cured products. Thus curatives provided by this invention may be employed with any polyurethane prepolymer known to the art. Because of their relatively long pot lives they are particularly suitable for use with prepolymers of high reactivity and for applications such as molding and casting large objects. It is also especially noteworthy that amine curatives of the present invention possess reactivities which are slow enough to enable them to be used with prepolymers derived from methylene bis (4-phenylisocyanate) in contrast to amine curatives heretofore known which yield insufficient processing times for use with such prepolymers. While any of the prepolymers known in the art may be cured with the instant curatives, preferred prepolymers will generally be difunctional in nature and will normally have isocyanato equivalent weights ranging from about 300 to about 2000, and more frequently from about 500 to about 1500. Suitable polyurethane prepolymers are conventionally prepared by reacting an excess of an organic diisocyanate with a polymeric diol having a molecular weight ranging from about 400 to about 4000. Small amounts of lower molecular-weight diols, such as 1,4-butanediol, diethylene glycol and the like may be admixed with the polymeric diol in preparing the prepolymer. Small amounts of triols may also be used in the preparation of the prepolymers. The equivalent ratio of diisocyanate to diol may range from 1.5 to 2.5, and more preferably is about 2 to 1.

Typical polymeric diols useful for the preparation of suitable prepolymers comprise polyether glycols, polyester glycols and $\alpha,\omega$-hydroxy poly(alkylenes). Useful polyether glycols are characterized by the general formula $HO(RO)_nOH$ wherein R is a straight-chain or branched alkylene radical of from 1 to about 10 carbon atoms and n is an integer ranging from about 3 to about 100. Examples of useful polyether glycols are those derived from the ring-opening polymerization of cyclic aliphatic ethers. Such polyether glycols include polybutylene glycol, polypropylene glycol, polyethylene glycol, polytetramethylene glycol and polyether glycols derived from the copolymerization of propylene oxide and ethylene oxide.

Useful polyester glycols should contain a plurality of hydroxyl groups and have an acid number of less than two. Suitable polyester glycols comprise those derived from the ring-opening polymerization of lactones, such a poly-($\epsilon$-caprolactone) for example, and those prepared by condensation polymerization of dibasic acids or anhydrides and polyols, according to conventional procedures recorded in the art. Representative of useful common condensation-type polyesters are hydroxy-terminated polyesters of aliphatic dicarboxylic acids, such as adipic acid, azelaic acid or sebacic acid with aliphatic glycols having from two to six carbon atoms, such as ethylene glycol, 1,2-propylene glycol, 1,4-butylene glycol, 1,3-butylene glycol, 1,6-hexanediol, and other aliphatic $\alpha,\omega$-diols.

Hydroxy-terminated polyhydrocarbons, such as dihydroxy poly(butadiene) for example are also useful. Other dihydroxy polymers can be used.

The diisocyanates reacted with the polymeric diols to form the prepolymers may either be aliphatic or aromatic diisocyanates. Small amounts of polyisocyanates having a functionality greater than two such as polymethylene polyphenylisocyanate or 1,2,4-benzene-triisocyanate may be admixed on occasion. Representative aliphatic diisocyanates which are of use include 1,4-tetramethylene diisocyanate, 1,6-hexamethylene diisocyanate, isophorone diisocyanate, 2,2,4-trimethyl hexamethylene diisocyanate, and 4,4'-methylenebis(cyclohexylisocyanate). Examples of suitable aromatic diisocyanates include 1,3-phenylene diisocyanate, 1,4-phenylene diisocyanate, 2,4-tolylene diisocyanate, 2,6-tolylene diisocyanate, mixed tolylene diisocyanates, 1,5-naphthylene diisocyanate, diphenyl diisocyanate, 2,4-diisocyanatodiphenyl methane, methylenebis (4-phenylisocyanate), 3,3'-dimethyl-4,4'-biphenylene diisocyanate, dialkyl substituted methylenebis(4-phenyl isocyanates), dialkoxy substituted methylenebis(4-phenyl isocyanates), tolidine diisocyanate, and so forth. Mixtures of isocyanates may be employed, of course.

The curatives of the present invention are especially useful for curing prepolymers derived from aromatic diisocyanates, and the preferred prepolymers are those prepared from an aromatic diisocyanate and a polymeric diol. The aromatic diisocyanates are generally used with the polymeric diols in a ratio from about 1.5 to 2.25 NCO to OH groups. Aromatic diisocyanates which result in particularly preferred prepolymers are 2,4-tolylene diisocyanate, 2,6-tolylene diisocyanate and mixtures of these two isomers, 2,4'-methylenebis(phenyl isocyanate), methylenebis(4-phenyl isocyanate) and mixtures thereof.

The instant curatives are reacted with polyurethane prepolymers according to standard experimental techniques known to the art. All reactants and equipment used should be dry and free from water and precautions should be taken to exclude moisture. Generally both the prepolymer and the curing agent are dried and devolatilized prior to use. The curing agent may be added as a solid to the prepolymer, intimately admixed, and the mixture stirred with heating until solution is obtained. Or, more conventionally, the molten curing agent may be intimately admixed and stirred together with the prepolymer, usually at an elevated temperature. The method of mixing molten devolatilized prepolymer and curative is preferred. Also, the two components may be heated, with agitation, until mixing is obtained. Other methods may be employed. For example, the curative may be finely divided, and mixed in solid form into the prepolymer, and the mixture subsequently heated below the melting point of the curative until solution is obtained. This may be called the "powder" technique. The curative may be dissolved or suspended in finely divided form in a small amount of an appropriate solvent, or plasticizer or in an appropriate amount of reactive material, especially a monomeric or polymeric diol or triol. The curative may be employed as a supercooled liquid or eutectic mixture of two or more curatives. The curative may also be employed according to the embodiment described hereinbelow in admixture with one or more of the various polyalcohols, aminoalcohols, or diamines now known to be useful as urethane curatives. And the prepolymers may be used as such, or may be in the form of adducts such as are now known to be heat labile, regenerating the free isocyanato groups on heating to an elevated temperature. Other modifications and combinations are contemplated and may be employed if desired.

The types and modes of agitation and the equipment employed are not limited provided they accomplish the desired mixing. Any conventional means of agitation or any desired modification of a previously unknown method may be suitable. Similarly, the means of handling the components of the curable mixture, of handling the curable mixture itself, or of forming the desired cured part, or of transferring the curable mixture into the form or mold used to provide the desired shape, or of heating or curing the components of the curable mixture, the curable mixture itself, or the formed part are all not limited, insofar as the desired results of mixing, heating, forming, and curing are obtained. In general, after mixing is obtained, the liquid mixture is poured or cast in molds, and heated at a temperature within the range specified hereinbelow until cured to a sufficiently solid state so that the mold may be removed. The casting may then be post cured at a substantially elevated temperature until the desired properties are obtained.

The following steps are illustrative of one preferred method of using the instant curatives:

1. The curing agent is raised to a temperature a few degrees above its melting point, or about 90° to 100° C., and a vacuum is applied, with stirring, to remove volatiles.

2. The prepolymer is raised to a temperature of about 90° to 110° C., and a vacuum is applied with stirring to remove volatiles. This devolatilization is continued for the length of time necessary to cause evolution of volatiles to cease, or become very slow. This period of time may be about 1 hour up to several hours. The prepolymer is then reduced in temperature to about 70° to 90° C.

3. The curing agent and prepolymer are fed into a mixing chamber or device in the correct stoichiometric ratio, and thence forced by pressure into the mold or other forming chamber to be used, and the flow is continued until the mold or chamber is filled. The mold or chamber may be at any temperature between about room temperature up to about 100° C., but frequently has been preheated to a temperature of about 50° to 95° C.

4. The liquid-filled mold or chamber is maintained at a temperature of from about 50° C. to about 95° C. until the prepolymer-curing agent mixture has become a firmly gelled casting, capable of mechanical handling without tearing, fracturing, or being subject to thermal shock. The time for this may range from about 30 minutes to several hours.

5. The formed product is then, or thereafter, removed from the mold or chamber and placed into a curing oven, and maintained at a temperature of from about 50° C. to about 95° C. until a thorough cure of the product has been obtained. This requires from about 2 hours to about 48 hours, depending on the materials used and the temperature employed. A very satisfactory empirical check on the process of the cure is the hardness of the cured product at oven temperature. This hardness is usually rather low when the part is originally brought to oven temperature, and rises rather rapidly as cure proceeds. When the hardness finally levels out, not changing appreciably over a period of 30 minutes to 1 hour between determinations, the cure can be considered to be near completion.

It is also within the scope of this invention to employ the instant curatives as components of one-shot systems. Such one-shot systems could for example be comprised of a polymeric diol, a polyisocyanate, and one or more of the instant curing agents. The curing agents of this invention are especially suited for this particular use, which more so than MOCA or dichlorobenzidine, insofar as the instant curing agents can be chosen to be much less reactive and thus prevent premature gelation, and also insure more nearly complete reaction of the slower reacting diol. A catalyst for the hydroxyl-isocyanate reaction, such as one of the commonly used tin catalysts may advantageously be included in the contemplated one-shot formulations.

Although standard equipment and experimental techniques are employed to cure polyurethane prepolymers with the curatives of this invention, there are two important and essential aspects in which the preferred use of the present curatives differs from the practice normally employed in the art for such curatives as MOCA and dichlorobenzidine. These critical features pertain to (1) the stoichiometric ratio in which the two components — the prepolymer and the curative — are employed, and (2) the temperature at which cure is effected. If the instant curatives are employed in amounts such that the ratio of amino groups to isocyanato groups approaches 1.0, incompletely cured products are obtained in most instances. Thus the present curing agents are frequently used at stoichiometric ratios of about 0.9 or less amino groups per isocyanato groups, although with certain slow reacting prepolymers stoichiometric ratios as high as about 0.95 amino groups per isocyanato group may be employed. The preferred ratio of amino groups in the curative to free isocyanato groups in the prepolymer will generally range from about 0.5, and more preferably from 0.6 to 0.90, and more preferably to 0.85, for purposes of the present invention.

For highest elongation and best tear resistance in the cured composition, a ratio of $NH_2$ to NCO groups of about 0.85 to 0.90 is desirably employed. A stoichiometric ratio in this range also gives cured compositions with high tendency to harden (i. e. crystallize) considerably after cure when waxy and easily crystallized prepolymers are employed. This is sometimes highly desirable as it leads to a very tough, resistant product. For cured compositions in which elongation, tear resistance, and crystallinity are desired, a stoichiometric ratio of $NH_2$ to NCO near 0.90 thus seems to be optimum.

For cured compositions in which optimum high temperature hardness and a very flat hardness versus temperature profile is desired, a lower stoichiometric ratio in the range of 0.50 to 0.80 should be employed. Stoichiometric ratios in this range also give products which crystallize only slightly or not at all, even with some highly crystalline prepolymers. Thus when these properties are desired, a stoichiometric ratio of about 0.65 to 0.80 of $NH_2$ to NCO groups seems to be optimum.

Concerning cure temperature, I have found that the instant curing agents should preferably be employed at cure temperatures of no higher than about 95° C. Cure temperatures in excess of 95° C. provide cured products with lowered hardness and rapid loss of hardness with increasing cure temperature is observed. There seems to be a slight advantage in decreasing cure temperature to about 80° C., but improvements resulting from even lower temperatures are relatively minor. The large degradation in properties occurs at temperatures above 95° C., and the loss of hardness becomes progressively more pronounced as cure temperature is increased still further to 125° C. Thus, optimum cure temperatures for use with the instant compositions range from about 70° C. to 90° C, with the best properties being obtainable at about 80° C.

While the cure temperature is thus critical, once the compositions reach a hardness near their ultimate value (within a few points on the Shore durometer scale), further post-cure at higher temperatures can be employed, and post-cures at temperatures in the range of 120° C. to 130° C. have little detrimental effect. In general post-cure treatments will be carried out within a temperature range of about 90° to 130° C., although higher temperatures may sometimes be employed.

The cure period will vary with the cure temperatures employed. For cure temperatures of 70°–90° C., the required cure times depend on the speed of the prepolymer. In general at least 6 hours and more preferably at least 12 hours are required for a reasonable cure. Frequently, a 24 to 72 hour cure period may be required to provide optimum hardness and other properties. Even longer cure periods, up to one week, may sometimes be employed. These longer cure cycles are particularly necessary when the diaminodisulfide employed is slow to complete the cross-linking reaction.

The instant curatives, and especially the preferred 2,2'-diaminodiphenyl disulfide, readily provide reasonable cured compositions at cure temperatures as low as 50° F. For cures at such low temperatures, cure times of 1 to 3 weeks may be required, however.

If the preferred stoichiometric ratios and cure temperatures described hereinabove are employed with the unsubstituted 4,4'-diaminodiphenyl disulfide, compositions with significantly improved physical properties are obtained compared to those described in the art. For example, this compound gives improved results if a cure temperature not exceeding 95° C. and a cure period of 1 to 3 days is used.

In addition to the curative and the prepolymer the reaction mixture may also contain other components generally employed in the production of polyurethane products. Specifically small amounts of catalysts may be included in the reaction mixture to affect the rate of the various reactions which take place during the cure. Representative conventional catalysts which can be especially useful are tin compounds, such as stannous octoate, and dibutyltin dilaurate, tertiary amines, such as triethylamine, tetramethylbutanediamine, triethylene diamine, and N-methyl morpholine, and cobalt salts such as cobalt naphthenate. Other materials, such as fillers, reinforcing agents, plasticizers, dyes, pigments, flame retardants, levelling agents, nucleating agents, cell-size control agents, blowing agents, mold release agents, light and heat stabilizers, antioxidants, stabilizers against chemical degradation and all other additives known to be of use and employed by those skilled in the art in the production of molded plastics, elastomers, foams, films, coatings and the like may be employed in preparing polyurethane compositions according to the teachings of the present invention.

The aromatic diamino disulfides described hereinabove are excellent curatives in and of themselves. I have additionally found that diamino disulfides are very useful as constituents of curative blends comprising one or more other types of curatives. Thus another preferred embodiment of the present invention is the use of mixed curatives comprising diamino disulfides, and especially aromatic diamino disulfides in admixture with other isocyanato-reactive compounds selected from the group consisting of monomeric and polymeric diols and aromatic diamines. Especially preferred are admixtures of diaminodiaryl disulfides with polymeric diols and with aromatic diamines. Such curative blends possess advantages in that they offer a wider latitude and permit very effective tailoring of such properties as degree of hardness, pot life and cure cycle.

Curatives composed of aromatic diamino disulfides in admixture with polymeric glycols are especially useful in preparing castings of lower hardness that may be prepared by using the aromatic diamino disulfides alone as curatives. These blends also serve to modify the reactivity of the curative. Thus the use of such blended curatives permits some degree of control over the softness and the hardness of the cured compositions, as well as the pot life. For example, I have discovered that 4,4'-diaminodiphenyl disulfide, which is too reactive to provide a satisfactory pot life, can be slowed down sufficiently to be useful when blended with a polymeric diol. Suitable blended curatives containing polymeric diols will generally contain from about 5 percent to 99 percent and more preferably from about 10 to 50 percent by weight of the aromatic diamino disulfide, and from about 1 percent to 95 percent and more preferably from about 50 to 90 percent by weight of polymeric diol, said weight percentages being based on the combined weight of the mixture. Polymeric diols preferred for use in preparing the curative blends comprise linear and slightly branched aliphatic glycols having terminal hydroxyl groups and having molecular weights ranging from about 400 to generally not more than 4000. Examples of preferred diols for blending include polyester glycols such as for example those derived from such acids as adipic acid, azelaic acid or sebacic acid and such glycols as ethylene glycol, propylene glycol or 1,4-butylene glycol, poly(lactones) such as for example polycaprolactones, and polyether diols, such as for example polypropylene glycols or polytetramethylene glycols.

Although admixture of the disulfide curatives and amines is generally useful another particularly preferred embodiment consists of the use of admixtures of aromatic diamino disulfides and unhindered or slightly hindered aromatic diamines as curatives. The term hindered and slightly hindered is well known in the art and refers respectively to unsubstituted diamines and to diamines which carry substituents which by virtue of their size and position in relation to the amino group do not interfere with the reactivity of the amino group to a substantial degree. Aromatic diamines of this type are well known as curing agents for polyurethane prepolymers and they yield cured products with satisfactory to good properties. These slightly hindered or unhindered aromatic diamines react, however, far too fast to be useful by themselves to cure many of the prepolymers prepared from aromatic diisocyanates, and they are not now used for this purpose. Properly employed, the blend of aromatic diamine and aromatic diamino disulfide combines the best features of both curatives. For example, the pot life and cure rate can be materially affected by the proportions of aromatic diamine and aromatic diamino disulfide in the combination curative. Thus such blends offer a pot life approaching that of the aromatic diamino disulfide and significantly shorter cure cycles than the diamino disulfides alone. In fact, such combination curatives make possible even a room temperature cure. Further, these advantages are obtained without any sacrifice in or impairment of the physical or chemical properties of the cured product.

Various ratios of the components may be utilized, depending on the application employed. At higher ratios of aromatic diamine, the combination curing agent tends to behave like an aromatic amine curative except that it has a lengthened pot life, and the lengthening of pot life thus obtained may be a factor of up to several fold. At the other end of the scale, when only about a few percent of aromatic amine is employed, the combination curing agent has properties very similar to the diaminoaromatic disulfide except that the curing rate is considerably speeded up, by a factor of several fold in some cases.

The hindered and slightly hindered aromatic diamines contemplated for use in combination with the diamino disulfides may have from 6 to about 15 carbon atoms, and may have alkyl or alkoxy substituents, but should not have halogen substituents adjacent to the amino radicals, i.e. in the ortho positions. Representative useful diamines are 1,2-phenylene diamine, 1,3-phenylene diamine, 1,4-phenylene diamine, 2,4-tolylene diamine, various xylene diamines, N,N'-di lower alkyl-1,3-phenylene diamine, N,N'-di lower alkyl-1,4-phenylene diamine, methylene bis(aniline), 3,3'-dimethoxybenzidine, tolidine, 1,5-diaminonaphthalene and 1,8-diaminohaphthalene. 1,3-Phenylene diamine, methylene bis(aniline), and 1,5-diaminohaphthalene are especially preferred. The especially preferred aromatic diamino disulfide for use in combination with these aromatic diamines is 2,2'-diaminodiphenyl disulfide.

Useful curative blends of aromatic amino disulfide and aromatic diamines will have from 1 to about 75 percent, and more preferably from about 5 to about 50 percent by weight of aromatic diamine and from about 25 to 99 percent, and more preferably from about 50 to about 99 percent by weight of the aromatic diamino disulfide, said weight percentages being based on the combined weight of the mixture. Sometimes it is especially preferred to use from about 5 to about 40 percent by weight of aromatic diamine and from about 60 to about 95 percent by weight of aromatic diamino disulfide.

A still further advantage of such curative blends is that such mixtures possess melting points distinctly lower than those of the higher melting component, and frequently exhibit melting points lower than either component. This feature assures greater ease and convenience in handling. For example, the instant invention is very useful when applied to 1,5-diaminonaphthalene. This aromatic diamine is an excellent curing agent itself with good pot life. This amine, however, melts at such a high temperature that it cannot be employed as a melt. In combination with the appropriate aromatic diamino disulfide the melting point is lowered to a usable value.

The curative blends are readily prepared by mixing the components in the proper ratio and heating them together with stirring until a homogeneous solution is obtained. This generally occurs at or moderately below the melting point of the aromatic diamino disulfide.

The instant curative blends are employed to cure prepolymers in the same manner as conventional curing agents. They seem to constitute very close replacements for MOCA and dichlorobenzidene. In curing prepolymers the curative blends of diaminodisulfides and amines are generally used in amounts such that the equivalent ratio of total amino groups to isocyanato groups varies from about 0.75 to 1.00, and more preferably from about 0.85 to about 0.95. Curative blends of diaminodisulfides and polyols are employed in amounts such that the ratio of the sum of hydroxyl plus amino groups to isocyanato groups varies from about 0.5 to 1.0. Cure schedules employed with curative blends are similar to those generally used in the art with MOCA. Depending on the nature of the blend and the proportion of the constituents, cure temperatures may vary from room temperature to about 125° C.

It is sometimes advantageous to employ more than two components in a curative blend. For example, two or more aromatic diamines, or two or more diamino aromatic disulfides may be used. This particular embodiment is especially useful in obtaining very low melting or liquid curing agents. Use of two or more low-melting aromatic diamines such as m-phenylene diamine and methylene bis(aniline) is frequently desirable in this embodiment.

Another preferred embodiment of the instant invention is a combination curing agent mixture comprising a) an aromatic diamino disulfide, b) an aromatic diamine, and c) a polymeric diol. Such a triple combination makes possible a simultaneous enjoyment of the advantages already described as being gained by use of a mixture of a polymeric diol together with a diamino aromatic disulfide, as well as those advantages just described above for use of an aromatic diamine in combination with the diamino aromatic disulfide. In general, it may be said that a combination of these three components makes possible liquid or low-melting curing agent mixtures suitable for providing soft to moderately hard cured products having good physical properties, and allows a wide range of possible pot lives and curing conditions, including room-temperature cure.

Useful ternary curative blends consisting of aromatic diamino disulfides, aromatic diamines and polymeric diols will desirably be composed of from 5 to 99 percent, and more preferably from 10 to 50 percent by weight, based on the total weight of the curative blend, of amino-group-containing components, with the remainder being composed of the diol component. The amount of diamino disulfide in the amino-group-containing component will vary from 1 to 99 percent, and more preferably from about 5 to 95 percent of the weight of the amino-group-containing component.

The instant invention contemplates specifically the preparation of thermoset polyurethane compositions. Thus the compositions of the invention are characteristically cross-linked and insoluble. The products prepared according to the teachings hereinabove may range from very soft, flexible and extensible compositions to quite hard, rigid and inflexible products. For example, when in the form of a cured elastomer, the products may be as soft as about 10 to 20 Shore A, especially when added plasticizer is employed, or the products may be as hard as about 80 to 90 on the Shore D scale, especially when fillers or reinforcing agents are used. Polyurethane compositions prepared with the curatives of this invention not only have excellent heat stability and chemical resistance, but also possess excellent stability against degradation and discoloration due to exposure to light.

The cured products prepared according to the present invention may be used in any form or shape and for any application in which cross-linked, cured polyurethanes are usually employed. For example, these polyurethanes may be employed in the form of cast elastomers, cast films, shaped foams or surface coatings. Cast or shaped elastomers are contemplated as among the preferred embodiments.

The following examples are presented to illustrate the present invention, but should not in any way be interpreted as limiting the scope of the invention.

EXAMPLE I

A prepolymer was prepared by reacting 82.0 pounds of tolylene diisocyanate (composed of 80% 2,4-isomer and 20% of 2,6-isomer) with 430.0 pounds of a hydroxyl-terminated polycaprolactone diol of 2000 molecular weight. The tolylene diisocyanate was added to the molten polycaprolactone in a 300 gallon reactor, and on stirring the mixture rose rather rapidly in temperature to 80° C. The hot mixture was allowed to stand in the vessel overnight, with no external heating or cooling. The resulting product was a low-melting wax having an isocyanato equivalent weight of 1000, (NCO content 4.2% by weight) and having a small content of free tolylene diisocyanate.

In an aluminum weighing dish, 9.7 grams of the above prepolymer and 1.4 grams of 2,2'-diamino-4,4'-dichlorodiphenyl disulfide were heated on a hot plate and stirred together. The liquid mixture was placed in a 65° C. oven, and after 30 minutes was still very fluid. After standing overnight the mixture had formed a firm gel. The casting was then cured at 110°–115° C. for 6 hours. The cured casting had a hardness of 70 on the Shore A scale when first cooled, and after 3 weeks at room temperature, the hardness was 87 on the Shore A scale. The cured casting was tough and cut resistant.

The above example is repeated using 4,4'-diamino-2,2'-dichlorodiphenyl disulfide in place of its isomer. The properties of the cured product are very similar.

The above example is again repeated using 4,4'-diamino-3,3'-dimethoxydiphenyl disulfide as the curative. The properties of the cured product are again very similar.

For purposes of comparison, the above prepolymer when cured with MOCA gives a hardness of about 68–70 on the Shore A scale at cure temperature, and a hardness of about 73–75 when first cooled. After long standing, the MOCA-cured material has a hardness of 82–84 on the Shore A scale.

EXAMPLE II

Bis [8-aminonaphthyl(1)] disulfide, melting point 118° C., is prepared according to the published procedure (A. Reissert, Ber. 55, 868–73 (1922)).

1.5 grams of this disulfide are used to cure 9.6 grams of the prepolymer of Example I. Again, a long pot life is noted. The properties of the cured product are similar to those of the product of Example I.

EXAMPLE III 139.1 grams of 4-bromo-4'-nitrobiphenyl is reacted with 71.5 grams of sodium sulfhydrate (NaSH) in 500 ml. of 90% ethanol at reflux temperature to prepare the 4-amino-4'-sulfhydryl biphenyl. The reaction product is filtered hot, and then 28.5 grams of 30% hydrogen peroxide is slowly added with stirring and the mixture then allowed to cool. The product bis [4-aminobiphenyl(4')] disulfide precipitates rapidly from solution in a fairly pure form. The product is then filtered and allowed to dry.

1.8 grams of the very finely powdered bis-(aminobiphenyl) disulfide is added to 10.5 grams of the prepolymer of Example I, and the mixture is heated to 100° C. and stirred vigorously until the mixture begins to increase substantially in viscosity. The stirring is then discontinued and the mixture allowed to gel at 100° C. and the gel is then cured for 6 hours at 115° C. The resulting product is similar in properties to that of Example I.

EXAMPLE IV 4,4'-Diaminodiphenyl disulfide (technical grade) was recrystallized from anhydrous isopropanol to yield greenish-yellow flat needles having a melting point of 72°–73° C. In an aluminum weighing dish was placed 0.65 grams of the recrystallized 4,4'-diaminodiphenyl disulfide and 7.55 grams of the prepolymer of Example I. The dish was heated on a hot plate and stirred until solution was obtained, and was then placed into a 65° C. oven. The mixture gelled in 3 minutes from the time that solution of the curative had been obtained. The gel was then cured at 81° C. for 4 hours and cured at 65° C. for a further 42 hours. The cured product had a hardness of 62 on the Shore A scale at 65° C. and 67 on the Shore A scale when first cooled to room temperature.

For comparison, when 1.05grams of recrystallized 2,2'-diaminodiphenyl disulfide was used to cure 10.85 grams of the prepolymer of Example I, using the same procedure as above, the pot life was about 30 minutes at 65° C. before gelation took place.

For further comparison, when 1.2 grams of MOCA were used to cure 10.1 grams of the prepolymer of Example I, using the same procedure as above, the pot life was 10 minutes at 65° C.

EXAMPLE V

A mixture of 0.35 grams of the recrystallized 4,4'-diaminodiphenyl disulfide of Example IV and 0.3 grams of recrystallized 2,2'-diaminodiphenyl disulfide was used to cure 7.5 grams of the prepolymer of Example I, using the procedure of Example I. The pot life was about 11 minutes at 65° C. The cured product had a hardness of 66 on the Shore A scale at 100° C., and was 69 Shore A when first cooled. After standing for 1 to 2 days at room temperature, the casting had a hardness on the Shore D scale of 50.

EXAMPLE VI 50.5 grams of polytetramethylene glycol of 1000 molecular weight and 24.8 grams of freshly distilled methylene bis (4-phenyl isocyanate) are slowly heated under nitrogen, with stirring, until solution is obtained. The mixture is then maintained at 65° C. for 6 hours to yield a crystallizable prepolymer of 740 equivalent weight.

10.0 grams of this prepolymer and 1.4 grams of recrystallized 2,2'-diaminodiphenyl disulfide are placed into an aluminum weighing dish, and heated on a hot plate with stirring. The mixture has a pot life of about 3 minutes in a 65° C. oven after solution has been obtained. The gelled mixture is cured at 120° C. for about 6 hours. The cured product has a hardness of 65–70 on the Shore A scale at 110° C. and of 80 on the Shore A scale when first cooled to room temperature. After standing 3 days at room temperature, the hardness is 83 on the Shore A scale.

When 0.45 grams of the recrystallized 4,4'-diaminodiphenyl disulfide of Example IV are heated and stirred with 3.95 grams of the above prepolymer, the mixture gels in about 15–30 seconds, and before good mixing of the components is obtained. This mixture does not cure to a satisfactory elastomer when cured for 2 days at 65° C., but still exhibits opacity and inhomogeneity.

EXAMPLE VII

In an aluminum weighing dish a mixture was made of 2.0 grams of 2000 molecular weight polycaprolactone diol and 0.7 grams of recrystallized 2,2'-diaminodiphenyl disulfide. The mixture was heated with stirring until solution was obtained. Then 9.6 grams of the prepolymer of Example I were added, and the mixture reheated and stirred until solution was obtained. The pot life of the mixture was about one hour at 65° C. After curing at 115° C. for about 8 hours, the product had a hardness of 56 on the Shore A scale at 115° C., and 60 on the Shore A scale when first cooled. The casting crystallized on standing for 3 or 4 days, reaching a hardness of 55 on the Shore D scale. The hardened product was extremely tough and cut resistant, although still quite resilient.

This example is repeated, using 2000 molecular weight polytetramethylene glycol in place of the polycaprolactone diol. Very similar results are obtained.

EXAMPLE VIII

A prepolymer was prepared by reacting 140.0 grams of polytetramethylene glycol of 310 equivalent weight, and 72.9 grams of tolylene diisocyanate (80% 2,4-isomer and 20% 2,6-isomer), at 65° C. 13.5 grams of this prepolymer was cured using 3.4 grams of 2,2'-diamino-4,4'-dichlorodiphenyl disulfide, using the procedure of Example I. The pot life was 13 minutes at 65° C., and the resulting casting had a hardness of 65 on the Shore D scale when first cooled, and hardened to about 70 on the Shore D scale on standing for 24 hours. The product had a hardness of 42 on the Shore D scale at 100° C.

For comparison, the same prepolymer cured with MOCA gave a hardness of 60 on the Shore D scale.

EXAMPLE IX

A prepolymer was prepared by reacting 219.5 grams of polytetramethylene glycol of 310 equivalent weight and 123.4 grams of tolylene diisocyanate (80% of the 2,4-isomer and 20% of the 2,6-isomer), at 65° C. 2.0 grams of the recrystallized 2,2'-diamino diphenyl disulfide was used to cure 10.2 grams of the prepolymer, first heating the mixture on a hot plate to effect solution, and then curing for 4 days at 79° C. The pot life was about 9 minutes at 79° C. The cured product had a hardness of 55 on the Shore D scale at 79° C. and 70 on the Shore D scale when first cooled to 60° F. After 2 days at 60° F. the casting had a hardness of 65 on the Shore D scale.

EXAMPLE X

A prepolymer is prepared from 212.4 grams of a hydroxyl-terminated aliphatic polyester of about 2500 molecular weight and 29.1 grams of 2,4-tolylene diisocyanate by heating at 65° C. The polyester is prepared from adipic acid and an excess of a mixture of ethylene glycol and propylene glycol, in a weight ratio of about 70% ethylene glycol and 30% propylene glycol. 13.6 grams of this prepolymer is cured with 0.9 grams of the recrystallized 2,2'-diaminodiphenyl disulfide, using the procedure of Example I. The pot life at 65° C. is about one hour or more. The cured product has a hardness of 45 on the Shore A scale at 110° C. and 53 on the Shore A scale when cold. A slight further hardening appears to take place on standing.

A mixture is made from 0.25 grams of m-phenylene diamine and 0.3 grams of recrystallized 2,2'-diamino diphenyl disulfide. The mixture is heated on a hot plate and stirred to effect solution. The liquid mixture is then thoroughly mixed with 12.4 grams of the prepolymer of this example, and the mixture allowed to stand at room temperature. After 2 days a very soft rubber has formed. After 17 days a tough elastomer has been formed which has a hardness of 62 on the Shore A scale.

EXAMPLE XI

A prepolymer was prepared by mixing 134.7 grams of polytetramethylene glycol of 1000 molecular weight and 47.2 grams of 2,4-tolylene diisocyanate and then heating for 4 hours at 65° C.

32.5 grams of the above prepolymer was heated and mixed with 4.7 grams of recrystallized 2,2'-diaminodiphenyl disulfide. The fluid mixture was poured into an open horizontal mold 4 inch by 4 inch in size, reacted at 65° C. for 2 hours and then cured for 40 hours at 91° C. The cured casting in the form of a sheet was clear, was 0.100–0.130 inches thick, and had a hardness of 89 on the Shore A scale when first cooled. The cast sheet had a number of trapped gas bubbles.

Two tensile tests performed on dumb-bell shaped specimens stamped out of this sheet yielded strengths of 4000 and 4210 psi.

Two Graves tear tests performed on specimens stamped out of this sheet yeilded strengths of 280 and 236 pli.

EXAMPLE XII

A mixture was made of 0.1 grams of m-phenylene diamine and 0.8 grams of recrystallized 2,2'-diaminodiphenyl disulfide. This mixture was heated on a hot plate and stirred to effect solution. To this mixture was added 10.0 grams of the prepolymer of Example I, followed by reheating on the hot plate and stirring to effect solution. This mixture was then cured for 4 days at 80° C. The cured product had a hardness of 73–76 on the Shore A scale, and was tough.

This example is repeated, using methylenebis(aniline) in place of the m-phenylene diamine. Similar results are obtained.

This example is again repeated, using 1,5-diaminonaphthalene in place of the m-phenylene diamine. Again similar results are obtained.

EXAMPLE XIII 32.7 grams of the prepolymer of Example I was melted and held at about 80° C. until clear of bubbles. Then 3.7 grams of recrystallized 2,2'-diaminodiphenyl disulfide was stirred into the heated prepolymer to form a solution. The mixture was poured into an open 4 inch by 4 inch horizontal mold and cured at 79° C. for 2 days. The cured sheet had a hardness of 71 on the Shore A scale at 79° C. and 78 on the Shore A scale when first cooled to room temperature. After standing for one week, the sheet had reached a hardness of 50 on the Shore D scale.

Using the Graves tear test, the strengths determined were 363 and 319 pli., with the tears being propagated through the specimens in a smooth manner at a nearly constant stress. In a tensile test, the specimen shows a very high elongation at a low and nearly constant stress.

EXAMPLE XIV

This example illustrates the large differences in properties of the cured product which may be obtained by varying the stoichiometric ratio and the cure temperature. In all cases, recrystallized 2,2'-diaminodiphenyl disulfide was used to cure the prepolymer of Example I.

Table I illustrates the effect of cure temperature on hardness values in Column 7 and 8. The data clearly show the sharp drop off in hardness as the cure temperature exceeds about 90° C. Further heating of Runs E and F produces very little further hardening.

Table I also demonstrates the effect of stoichiometric ratio on the ability of the cured product to crystallize, as indicated by the high hardness values (D 47–50), at a stoichiometric ratio of NH$_2$/NCO of about 0.90–0.95. It also illustrates the slight crystallization at stoichiometric ratios of about 0.70–0.75.

TABLE I

| Run No. | Prepolymer, grams | Curative, grams | NH₂/NCO | Cure Time, hours | Cure Temperature, °C. | Hardness, Cure Temp. | Hardness, Cooled | Hardness, Aged Room Temp. |
|---|---|---|---|---|---|---|---|---|
| | | | | EFFECT OF CURE TEMPERATURE | | | | |
| A | 10.35 | 1.05 | 0.82 | 48 | 66 | A 79 | A 79 | |
| B | 9.75 | 1.1 | 0.90 | 48 | 75 | | A 80–82 | |
| C | 30.8 | 2.9 | 0.75 | 48 | 91 | A 78 | A 80 | |
| D | 10.2 | 1.0 | 0.78 | 48 | 95 | A 70 | A 73–74 | |
| E | 10.4 | 1.05 | 0.81 | 6 | 115–125 | A 61 | A 68–69 | |
| F | 10.5 | 1.05 | 0.80 | 4 | 125 | A 52 | A 66 | |
| | | | | EFFECT OF STOICHIOMETRIC RATIO | | | | |
| G | 10.3 | 0.9 | 0.70 | 48 | 80 | A 78 | A 80 | A 76 |
| C | 30.8 | 2.9 | 0.75 | 48 | 91 | A 78 | A 80 | A 84 |
| B | 9.75 | 1.1 | 0.90 | 48 | 75 | | A 80–82 | D 50 |
| H | 10.3 | 1.2 | 0.93 | 48 | 65 | A 75 | A 78 | D 47 |

EXAMPLE XV

A cured product similar to that of Example XIII was made, using 2,2'-diaminodiphenyl disulfide as a curative for the prepolymer of Example I. This cured sample was exposed to UV light from a high-pressure mercury source, at a distance of about 6 inches, for a period of 12 hours.

The product showed no observable darkening as a result of the exposure.

I claim:

1. A cured polyurethane composition comprising the reaction product of (A) an organic polyisocyanate, (B) a polymeric diol, and (C) an organic diamino disulfide selected from the group consisting of
    a. diamino diphenyl disulfides with amino groups located in different phenyl radicals and having the amino groups located in positions ortho to the disulfide group,
    b. diamino dinaphthyl disulfides having melting points below 150° C., and with amino groups located in different naphthyl radicals,
    c. organic diamino disulfides having the structure NH₂—Ar—S—S—R'—NH₂ or NH₂—R'—S—S—R'—NH₂ in which Ar is an aryl radical and R' is a tertiary aliphatic or cycloaliphatic radical in which the amino group is attached to the tertiary carbon atom, and
    d. organic diamino aryl disulfides in which one of the radicals attached to the disulfide group is a diaminoaryl radical and the other radical attached to the disulfide group is either an aryl or a lower alkyl radical, in which said (C) may have been reacted simultaneously with said (A) and (B), or in which said (A) and (B) may have been reacted together to form a polyurethane prepolymer before reaction with said (C).

2. A composition according to claim 1 in which said (C) is an ortho, ortho'-diaminodiaryl disulfide.

3. A composition according to claim 2 in which said (C) is 2,2'-diaminodiphenyl disulfide.

4. A composition according to claim 2 in which said (C) is 2,2'-diamino-4,4'-dichlorodiphenyl disulfide.

5. A composition according to claim 2 in which said (C) is 2,2'-diamino-4,4'-di-lower-alkyldiphenyl disulfide.

6. A composition according to claim 1 in which said (C) is bis [8-aminonaphthyl(1)] disulfide.

7. A composition according to claim 1 in which said (C) is bis [1-aminonaphthyl(2)] disulfide.

8. A composition according to claim 1 in which said (C) has the structure

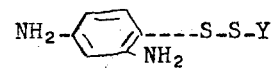

wherein Y is an aryl or lower alkyl radical.

9. A composition according to claim 1 in which the ratio of NCO groups in said (A) to the OH groups in said (B) ranges from 1.75 to 2.50, and the ratio of the sum of the OH groups in said (B) plus NH₂ groups in said (C) to the NCO groups in said (A) ranges from 0.50 to 0.95.

10. A curative comprising a blend consisting of (a) an organic diamino disulfide selected from the group consisting of:
    1. diamino diphenyl disulfides with amino groups located in different phenyl radicals and having the amino groups located in positions ortho to the disulfide group,
    2. diamino dinaphthyl disulfides having melting points below 150° C., and with amino groups located in different naphthyl radicals,
    3. organic diamino disulfides having the structure NH₂—Ar—S—S—R'—NH₂ or NH₂—R'—S—S—R'—NH₂ in which Ar is an aryl radical and R' is a tertiary aliphatic or cycloaliphatic radical in which the amino group is attached to the tertiary carbon atom, and
    4. organic diamino aryl disulfides in which one of the radicals attached to the disulfide group is a diaminoaryl radical and the other radical attached to the disulfide group is either an aryl or a lower alkyl radical, and (b) an aromatic diamine.

11. The composition of claim 10 in which said (a) is a diaminodiaryl disulfide.

12. The composition of claim 11 in which the amount of (a) varies from 25 to 99 percent by weight and the amount of (b) varies from 1 to 75 percent by weight of the sum of the weights of (a) plus (b).

13. The composition of claim 11 in which said (a) is 2,2'-diaminodiphenyl disulfide.

14. The composition of claim 11 in which said (a) is 2,2'-diamino-4,4'-dichlorodiphenyl disulfide.

15. The composition of claim 11 in which said (b) is selected from the group consisting of m-phenylene diamine, 2,4-tolylene diamine, and methylene bis(aniline).

16. A curative comprising a blend consisting of (a) an organic diamino disulfide selected from the group consisting of:
    1. diamino diphenyl disulfides with amino groups located in different phenyl radicals and having the amino groups located in positions ortho to the disulfide group,
2. diamino dinaphthyl disulfides having melting points below 150° C., and with amino groups located in different naphthyl radicals,
3. organic diamino disulfides having the structure $NH_2—Ar—S—S—R'—NH_2$ or $NH_2—R'—S—S—R'—NH_2$ in which Ar is an aryl radical and R' is a tertiary aliphatic or cycloaliphatic radical in which the amino group is attached to the tertiary carbon atom,
4. organic diamino aryl disulfides in which one of the radicals attached to the disulfide group is a diaminoaryl radical and the other radical attached to the disulfide group is either an aryl or a lower alkyl radical, and
5. substituted para, para' diamino diphenyl disulfides having substituents selected from the group consisting of lower alkyl and lower alkoxy radicals, and (b) a diol.

17. The composition of claim 16 in which said (a) is a diaminodiaryl disulfide and said (b) is a polymeric diol.

18. The composition of claim 17 in which said (a) is 2,2'-diaminodiphenyl disulfide.

19. The composition of claim 17 in which said (a) is 4,4'-diaminodiphenyl disulfide.

20. The composition of claim 17 in which said (a) is 2,2'-diamino-4,4'-dichlorodiphenyl disulfide.

21. The composition of claim 17 in which said (a) is a substituted 4,4'-diaminodiphenyl disulfide, with substituents selected from the group consisting of chloro, bromo, lower alkyl and lower alkoxy radicals.

22. The composition of claim 17 in which said (a) constitutes from 5 to 99 percent by weight and said (b) constitutes from 1 to 95 percent by weight of the sum of the weights of (a) plus (b).

23. A curative comprising a blend consisting of (a) an organic diamino disulfide selected from the group consisting of:
1. diamino diphenyl disulfides with amino groups located in different phenyl radicals and having the amino groups located in positions ortho to the disulfide group,
2. diamino dinaphthyl disulfides having melting points below 150° C., and with amino groups located in different naphthyl radicals,
3. organic diamino disulfides having the structure $NH_2—Ar—S—S—R'—NH_2$ or $NH_2—R'—S—S—R'—NH_2$ in which Ar is an aryl radical and R' is a tertiary aliphatic or cycloaliphatic radical in which the amino group is attached to the tertiary carbon atom,
4. organic diamino aryl disulfides in which one of the radicals attached to the disulfide group is a diaminoaryl radical and the other radical attached to the disulfide group is either an aryl or a lower alkyl radical, and
5. substituted para, para'-diamino diphenyl disulfides having substituents selected from the group consisting of lower alkyl and lower alkoxy radicals, (b) an aromatic diamine, and (c) a diol.

24. The composition of claim 23 in which said (a) is a diaminodiaryl disulfide.

25. The composition of claim 23 in which said (c) is a polymeric diol.

26. The composition of claim 24 in which said (a) is 2,2'-diaminodiphenyl disulfide.

27. The composition of claim 24 in which said (a) is 2,2'-diamino-4,4'-dichlorodiphenyl disulfide.

28. The composition of claim 24 in which said (a) is a substituted 4,4'-diaminodiphenyl disulfide, with substituents selected from the group consisting of chloro, bromo, lower alkyl, and lower alkoxy radicals.

29. The composition of claim 23 in which the amount of (c) constitutes from 1 to 95 percent the combined weights of (a) plus (b) plus (c), the amount of (a) plus (b) constitutes from 5 to 99 percent of the combined weights of (a) plus (b) plus (c), the amount of (a) constitutes from 25 to 99 percent of the combined weights of (a) plus (b), and the amount of (b) constitutes from 1 to 75% of the combined weights of (a) plus (b).

30. The process of producing a polyurethane composition which comprises intimately admixing a polyurethane prepolymer having isocyanato terminal groups with an organic diamino disulfide curative selected from the group consisting of:
a. diamino diphenyl disulfides with amino groups located in different phenyl radicals and having the amino groups located in positions ortho to the disulfide group,
b. diamino dinaphthyl disulfides having melting points below 150° C., and with amino groups located in different naphthyl radicals,
c. organic diamino disulfides having the structure $NH_2—Ar—S—S—R'—NH_2$ or $NH_2—R'—S—S—R'—NH_2$ in which Ar is an aryl radical and R' is a tertiary aliphatic or cycloaliphatic radical in which the amino group is attached to the tertiary carbon atom,
d. organic diamino aryl disulfides in which one of the radicals attached to the disulfide group is a diaminoaryl radical and the other radical attached to the disulfide group is either an aryl or a lower alkyl radical, and
e. 3,5,3',5'-tetra-lower-alkyl-4,4'-diaminodiphenyl disulfides, in an amount such that the stoichiometric ratio of amino groups to isocyanato groups ranges from 0.50 to 0.90 and allowing the reaction mixture to cure by maintaining a temperature ranging from room temperature to 95° C.

31. The process of claim 30 in which said organic diamino disulfide is 2,2'-diaminodiphenyl disulfide.

32. The process of claim 30 in which said organic diamino disulfide is 2,2'-diamino-4,4'-dichlorodiphenyl disulfide.

33. The process of claim 30 in which said organic diamino disulfide is a mixture containing 2,2'-diaminodiphenyl disulfide.

34. The cured composition prepared according to the process of claim 30.

35. A cured polyurethane composition comprising the reaction product of (A) an organic polyisocyanate, (B) a polymeric diol, and (C) a mixture of 2,2'-diaminodiphenyl disulfide and 4,4'-diaminodiphenyl disulfide, in which said (C) may have been reacted simultaneously with said (A) and (B), or in which said (A) and (B) may have been reacted together to form a polyurethane prepolymer before reaction with said (C).

36. A cured polyurethane composition comprising the reaction product of (A) an organic polyisocyanate, (B) a polymeric diol, and (C) a mixture of 2,2'-diaminodiphenyl disulfide and substituted 4,4'-diaminodiphenyl disulfides with substituents being selected from the group consisting of chloro, bromo, lower alkyl and lower alkoxy radicals, in which said (C) may have been reacted simultaneously with said (A) and (B), or in which said (A) and (B) may have been reacted together to form a polyurethane prepolymer before reaction with said (C).

37. The process of producing a polyurethane composition which comprises reacting (A) a polymeric polyol, (B) an organic polyisocyanate and (C) an organic diamino disulfide selected from the group consisting of
  a. diamino diphenyl disulfides with amino groups located in different phenyl radicals and having the amino groups located in positions ortho to the disulfide group,
  b. diamino dinaphthyl disulfides having melting points below 150° C., and with amino groups located in different naphthyl radicals,
  c. organic diamino disulfides having the structure $NH_2$—Ar—S—S—R'—$NH_2$ or $NH_2$—R'—S—S—R'—$NH_2$ in which Ar is an aryl radical and R' is a tertiary aliphatic or cycloaliphatic radical in which the amino group is attached to the tertiary carbon atom,
  d. organic diamino aryl disulfides in which one of the radicals attached to the disulfide group is a diaminoaryl radical and the other radical attached to the disulfide group is either an aryl or a lower alkyl radical, and
  e. 3,5,3',5'-tetra-lower-alkyl-4,4'-diaminodiphenyl disulfides, with the amounts of (A), (B), and (C) being such that the stoichiometric ratio of amino groups to isocyanato groups ranges from 0.50 to 0.90 and allowing the reaction mixture to cure in the presence of a catalyst for the reaction of isocyanato groups with hydroxyl groups.

38. The process of claim 37 in which said catalyst is selected from the group consisting of dialkyltin diacylates and stannous diacylates.

* * * * *